United States Patent [19]

Buchanan

[11] 3,988,959
[45] Nov. 2, 1976

[54] BOLT IDENTIFICATION SYSTEM
[75] Inventor: David Henry Buchanan, Victoria, Australia
[73] Assignee: Olin Corporation, New Haven, Conn.
[22] Filed: Mar. 11, 1974
[21] Appl. No.: 450,117

[30] Foreign Application Priority Data
 Mar. 9, 1973   Australia.............................. 2531/73

[52] U.S. Cl. ................................................ 85/77
[51] Int. Cl.² ......................................... F16B 13/06
[58] Field of Search............................ 85/77, 37, 36

[56] References Cited
UNITED STATES PATENTS
| 54,113 | 4/1866 | Clark ...................................... 85/77 |
| 752,588 | 2/1904 | Rettig ..................................... 85/37 |
| 2,974,558 | 3/1961 | Hodell ................................... 85/77 |
| 3,550,244 | 12/1970 | Villo et al................................ 85/37 |

FOREIGN PATENTS OR APPLICATIONS
| 12,795 | 11/1913 | United Kingdom..................... 85/77 |
| 567,274 | 2/1945 | United Kingdom..................... 85/77 |

OTHER PUBLICATIONS
"Slide Fastener" from Steck Manf. Co., Dayton, Ohio.

*Primary Examiner*—Roy D. Frazier
*Assistant Examiner*—Thomas J. Holko
*Attorney, Agent, or Firm*—Donald R. Motsko; H. Samuel Kieser; William W. Jones

[57] ABSTRACT

A means for providing an indication of the length of the bolt member of an anchor bolt assembly of the type including a bolt member and an expandable sleeve member. The end of the bolt member opposite the sleeve expanding portion thereof is provided with a recess, the depth of which is reversely proportional of the length of the bolt member.

3 Claims, 4 Drawing Figures

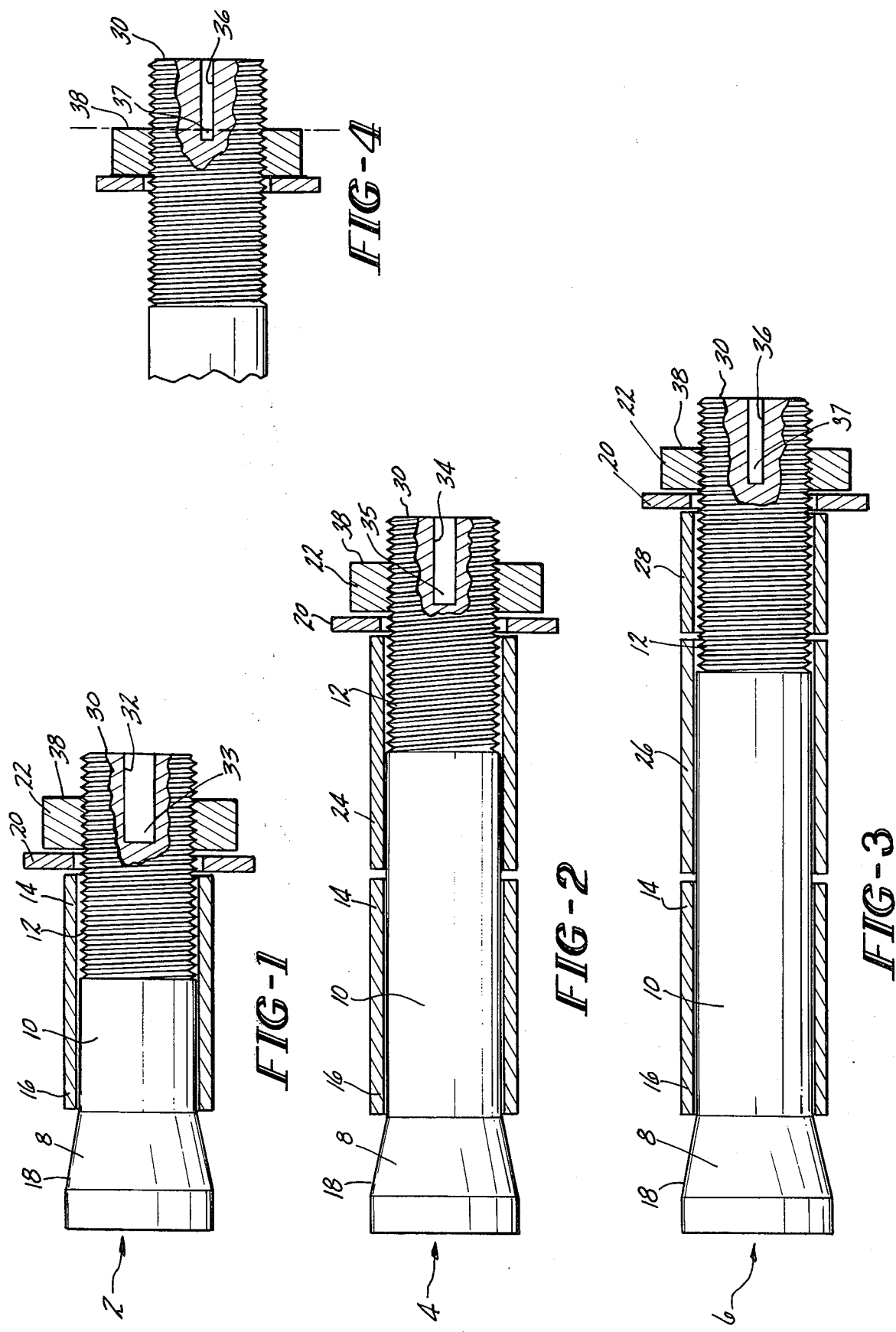

BOLT IDENTIFICATION SYSTEM

BACKGROUND OF INVENTION

This invention relates to bolts. It has particular application to bolts used in anchor bolt assemblies of the type which have expandable sleeves.

In some applications where the length of a bolt cannot be viewed steps must be taken to assure building inspection authorities that bolts of the right dimensions have been used to satisfy the regulations relating to a particular application. For instance, in the mounting of lift well guide rails, the building regulations require that bolts supporting the rails must extend for a prescribed length into the concrete wall forming the well. At present, the only sure method of ensuring that the bolts extend the full prescribed distance into the concrete is to tie the ends of the bolts to the concrete reinforcing bars prior to pouring the concrete. In this method where the bolts are cast-in there is a considerable problem in achieving correct positioning of bolts and frequently it is difficult to obtain correct alignment with the guide rails they are to support.

A more desirable method of positioning these bolts would be to drill the concrete after casting and inserting bolts having a known form of expandable means on their ends to set them in their correct positions. Unfortunately, at present, the inspection authorities have no way of determining whether the correct size of bolt of this type has been used and whether it has been set correctly in the concrete, and, consequently, it is not possible to use this method.

SUMMARY OF INVENTION

According to one of its aspects, the present invention provides a bolt having an end configuration such that the length of the bolt can be determined by inspection of its end. In preferred forms, the bolts may have end configurations such that the end configuration of a short bolt cannot be tampered with or modified, without difficulty, to resemble the end configuration of a long bolt.

According to this first aspect, the present invention provides a bolt having one end of its stem threaded, the end face of said one end being formed with a surface discontinuity the size of which is indicative of the length of the bolt. The surface may be in the form of a projection or depression, but, preferably comprises a bore which is coaxial with the stem.

In this specification surface discontinuity should be construed as a discontinuity in the surface of the material forming the bolt and should be distinguished from superficial treatment of the surface, for instance, painting. The surface discontinuity may conprise a region which is depressed relative to surrounding areas of the surface of the bolt, for instance, a bore or engraving, or alternatively, projecting relative to surrounding areas of the surface of the bolt, for instance, a protuberance, boss, or embossing.

Normally it is required to distinguish between bolts within a set of bolts that are useful for a particular purpose, each bolt in the set being of a different length. In this instance, and where the discontinuity comprises a depression, it is very desirable to have the biggest surface discontinuity on the shortest bolt of the set with progressively smaller discontinuities on progressively longer bolts, and thus having the smallest discontinuity on the longest bolt of the set. In this way there will be a known, inverse relationship between the size of the discontinuity and the length of the bolt. With such an arrangement it would be very difficult to modify the surface discontinuity of a short bolt to make it resemble that of a long bolt. For if the surface discontinuity were a bore, to pass a short bolt off as a long bolt, it would be necessary to fill the relatively large bore and re-drill a bore of a smaller diameter. If the opposite relationship between the size of the depression and bolt length were employed then it would be possible to drill-out or enlarge the bore in a short bolt to make it resemble the larger bore of a longer bolt, a situation which is clearly undesirable.

On the other hand where the surface discontinuity comprises a surface protuberance the longest bolt should be provided with the biggest protuberance and the shortest bolt with the smallest so that the task of making a short bolt appear like a long one would involve building up the size of the protuberance. This would be in contrast to the case where the opposite relationship between bolt length and size of the protuberance applied in which case a short bolt could be made to resemble a long one by reducing the size of the protuberance, for instance, by filing.

By a second aspect of the invention an indication of the length of a bolt may be provided by the color of an insert set into the bolt stem. According to this second aspect of the invention a contrasting colored insert is set into the threaded stem of a bolt to extend inwardly from its end face. Various bolts within a set of bolts which differ in length could be distinguished from one another by having a particular colored insert representative of a bolt of a particular length.

The invention further provides an anchor bolt assembly of the type comprising a bolt having a head and a threaded stem, a nut for the threaded stem and, sleeve means to encompass the stem between the bolt head and the unit, the sleeve means and the bolt head being interengageable by tightening of the nut to cause expansion of at least part of the sleeve means by a limited movement of the bolt head into the sleeve means, wherein the bolt stem has a recess or insert extending from its end remote from the head partway along the stem toward the bolt head such that when the nut has been tightened to cause said limited movement of the bolt head into the sleeve means the recess or insert extends toward the bolt head beyond the end face of the nut remote from the bolt head.

Preferably the recess or insert extends beyond said end face by no more than one inch. More particularly it may extend beyond that end face by a distance in the range ¾ to 1 inch.

DESCRIPTION OF DRAWINGS

The invention will now be further described with reference to the accompanying drawings in which:

FIG. 1 is a longitudinal cross-section of an anchor bolt assembly utilizing a bolt of relatively short length;

FIG. 2 is a longitudinal cross-section of an anchor bolt assembly utilizing a bolt of intermediate length;

FIG. 3 is a longitudinal cross-section of an anchor bolt assembly utilizing a bolt of relatively long length; and FIG. 4 is a partial longitudinal cross-sectional view of the anchor bolt assembly of FIG. 3, but showing the components in their position after the bolt assembly has been set in place.

DETAILED DESCRIPTION

In the drawing, the reference numeral 2 denotes a bolt which is shorter than an intermediate bolt 4 and which in turn is shorter than a long bolt 6. Each bolt comprises a head 8 and a stem 10 with a threaded end portion 12. Each bolt is provided with an expandable sleeve 14 which is expanded by being moved in the direction of the head 8 so that its end 16 engages a tapered face 18 of the head which causes the end 16 to move outwardly radially of the bolt. In the shortest bolt 2 the expandable sleeve 14 is caused to move towards the head 8 by means of a washer 20 interposed between the sleeve 14 and a nut 22 which is in threaded engagement with the threads 12 of the stem. The operation of the intermediate bolt 4 is the same as that of the shortest bolt 2 except that a spacing sleeve 24 is interposed between the expandable sleeve 14 and the washer 20 to accommodate for the extra length of the stem. Similarly, in the longest bolt 6 two extra sleeves 26 and 28 are required to accommodate for the increased length of the stem.

The end face 30 of the shaft remote from the head 8 of each bolt is provided with a central bore shown as 32, 34 and 36 respectively in bolts 2, 4 and 6. It is to be noted that the diameter of bore 32 is larger than that of bore 34 which in turn is larger than that of bore 36. The reason this relationship on bore diameter to shaft length is that it would be difficult to modify the bore 32 so that it has the diameter of the bore 34 or 36 whereby a short bolt 2 can by inspection of the end face 30, have the appearance of a longer bolt 4 or 6.

The lengths of the bores 32, 34, and 36 are chosen such that when the expandable sleeve 14 has been moved the required distance towards the head 8 for correct expansion, only the inner ends 33, 35, and 37 of the bores 32, 34 and 36 will extend into the stem from the outer face 38 of the nut 22 as seen in FIG. 4. Sometimes it is necessary to remove the portion of the stem that extends from the outer face 38 of the nut 22, and in this event, removal of the extending portion will still leave the end portion of the bores 33, 35 and 37 so that the bolts can be identified on inspection. If however the nut moves excessively towards the head 8 indicating that the expandable sleeve 14 has not functioned correctly, removal of the portion of the stem of the bolt extending from the face 38 of the nut will mean removal of the portion of the stem which contain the bores 32, 34 and 36 so that the remaining end face will have no bore in it, which will therefore be an indication of the fact that the bolt has not set correctly.

It will be appreciated that the bore in the bolt stem must extend beyond the outer face of the nut after the sleeve has been expanded but it should not extend so far as to allow overcropping when the bolt is not properly set. More particularly, the bore may extend beyond the outer face of the nut by no more than one inch and it is preferred that it should extend through a distance in the range ¾ to 1 inch.

The bores 32, 34 and 36 may be filled with a colored insert, the color of which is indicative of the length of the bolt. In this case, it is not necessary that the diameter of the bores 32, 34 and 36 should vary from one bolt to another, but the variation in diameter is preferred as it provides an additional indication. The colored insert may be in the form of a colored rod of plastics material press-fit into the bores or alternatively may comprise a body of colored material that has been placed in the bores in liquid form and subsequently solidified.

Many modifications will become apparent to those skilled in the art without departing from the spirit of the invention.

What is claimed is:

1. An identification system for anchor bolt assemblies of the type including a bolt member having a sleeve expanding portion at one end and expandable sleeve means on said bolt member adjacent said sleeve expanding portion for being expanded when the bolt member is moved relative to said expandable sleeve means so that the sleeve expanding portion enters said sleeve means, said system including a plurality of anchor bolt assemblies having bolt members of different lengths, each bolt member having a bore in its end wall opposite the sleeve expanding portion, the diameter of said bore being the smallest for the largest bolt member of the system and being progressively increased for each decrease in length of a bolt with said shortest bolt having a recess of greatest diameter.

2. The system of claim 1 wherein each assembly includes means including a threaded portion on said bolt member and at the end opposite said sleeve expanding portion and a nut member threaded on said threaded portion for moving said bolt member relative to said sleeve means to cause the expansion thereof, said bore in each said bolt member extending axially inwardly toward said sleeve expanding portion a sufficient distance so that when the sleeve is set and properly expanded, the bottom of the bore will be positioned axially forward toward the sleeve expanding portion of the plane of the rearward face of the nut member which faces away from the sleeve expanding portion of said bolt.

3. The system of claim 1 wherein said bore in each said bolt is provided with a colored material, the color of the material being different for each size bolt in said system.

* * * * *